United States Patent
Kurosu et al.

[11] Patent Number: 5,181,260
[45] Date of Patent: Jan. 19, 1993

[54] METHOD FOR DETERMINING THE AMOUNT OF SKEW OF IMAGE, METHOD FOR CORRECTING THE SAME, AND IMAGE DATA PROCESSING SYSTEM

[75] Inventors: Yasuo Kurosu, Yokosuka; Yoshihiro Yokoyama; Kenichi Nishikawa, both of Yokohama; Hidefumi Masuzaki, Hadano; Masaaki Fujinawa, Tokyo, all of Japan

[73] Assignee: Hitachi, Ltd., Tokyo, Japan

[21] Appl. No.: 606,613

[22] Filed: Oct. 31, 1990

[30] Foreign Application Priority Data
Oct. 31, 1989 [JP] Japan .................... 1-284046

[51] Int. Cl.$^5$ ............................. G06K 9/32
[52] U.S. Cl. ....................... 382/46; 340/727; 358/488; 382/42
[58] Field of Search ............ 382/46, 44, 42, 30; 340/727, 724; 350/488; 364/715.08

[56] References Cited
U.S. PATENT DOCUMENTS

| | | | |
|---|---|---|---|
| 3,831,146 | 8/1974 | Rundle | 382/46 |
| 4,110,737 | 8/1978 | Fahay | 382/30 |
| 4,633,507 | 12/1986 | Cannistra et al. | 382/46 |
| 4,658,428 | 4/1987 | Bedros et al. | 382/46 |
| 4,723,297 | 2/1988 | Postl | 382/46 |
| 4,736,437 | 4/1988 | Sacks et al. | 382/30 |
| 4,748,676 | 5/1988 | Miyagawa et al. | 340/727 |
| 4,754,076 | 7/1988 | Tanaka et al. | 382/46 |
| 4,802,229 | 1/1989 | Yamada | 382/46 |
| 4,941,189 | 7/1990 | Burtt | 382/46 |

*Primary Examiner*—Joseph Mancuso
*Attorney, Agent, or Firm*—Antonelli, Terry, Stout & Kraus

[57] ABSTRACT

Method for determining and correcting the amount of an skew of image which may be read by an image reader, preferably one with with an automatic paper feeding device. Information dependent on the angle of skew of image is obtained in a plurality of the directions with respect to image data and the amount of skew is determined based on the information obtained. Measurement of the information is performed in two or more stages (or steps). At the first stage, the measurement is performed within a narrow range of angles including a reference direction. If no skew angle is detected in the narrow range, then the measurement is performed again at the second stage in a wider range of angles. If a skew angle is detected in the first stage, the second stage is omitted. With the skew angle determined, the image data is rotated in accordance with the skew angle detected to cancel the skew. No correction of the image data is performed if skew angle detection does not result in either the first or the second stage. Preferably, correction of the image data is omitted if the detected skew angle falls within a very small range of angles.

11 Claims, 6 Drawing Sheets

METHOD FOR DETERMINING THE AMOUNT OF SKEW OF IMAGE, METHOD FOR CORRECTING THE SAME, AND IMAGE DATA PROCESSING SYSTEM

BACKGROUND OF THE INVENTION

1. Field of the Invention

This invention relates generally to a method for detecting and correcting the amount of an skew of image, and more particularly to a method and an apparatus for detecting and correcting the amount of skew of an image in which the method and apparatus are suitable when used in an image filing system equipped with an automatic paper feeding device.

2. Description of the Related Art

Image filing systems have recently come on the scene as the fourth office automation machine next to a word processor, a personal computer and a facsimile, attracting the public's attention as a means for pushing forward the concept of paperless document filing in offices, laboratories, etc. This image filing system is adopted to store a large volume of image data in an optical disk, from which image data can be read quickly as needed for printing. As a consequence, use of image filing systems have deeply spread particularly into departments where large volumes of documents are produced and, as a result of which, labor power for inputting such documents should be minimized.

Regarding this image inputting work, in a conventional image filing system equipped with an automatic paper supply device to automatically supply the documents to be inputted, the need to avoid a skew (tilt) which might occur between a document and a scanner, whereby the images would be inputted in a skewed posture, is inevitable. Yet, although such skew could be reduced to a very small amount, character rows in a document were often initially skewed.

A solution to these conventional problems has hitherto been proposed by Japanese Patent Laid-Open Publication (KOKAI) No. 14277/1987. The system of this prior art performs contour extracting from a document image, obtains a skew from the extracted characters and ruled lines, and then achieves the automatic correcting of the skew. Specifically, a specific amount of data is obtained with respect to the contour extracted from the image, and this specific amount of data is integrated in various directions. Then, a direction in which the integration value will be the peak is obtained, and the entire image is turned by an angle which is made by the direction with respect to the edge of paper sheet. By thus obtaining a skew of the entire document image from the contour, it is possible to automatically correct the image data in which a skew is created.

As mentioned above, the prior system obtains the amount of skew from the extracted contour data and corrects the skew of input an inputted image by using the amount of skew. Therefore, it is unnecessary to check by eye, which was necessary even with a scanner with an automatic supply device, so that the rate of registering the image data can be improved.

However, with this prior system, because the angle of skew was simply obtained and the entire document image was corrected by merely using the obtained angle of skew, problems with respect to processing time were still prevalent.

Specifically, when measuring an angle of skew, it was necessary to integrate a characteristic amount of data in all directions covering the range in which the skew of input image existed. Reportedly, since this integral included many integrating and summing operations, it resulted in a huge amount of calculation which would take several tens of seconds even by using a general large-sized computer whose processing rate is about 20 MIPS. Practically, this disadvantage is revealed particularly in an image filing system, which is a small-sized office automation machine.

Further since, when correcting the skew of an image, the image was turned by merely using the obtained angle of skew, such a very small amount of skew angle that could not be sensed by a human being would be unnecessarily corrected.

SUMMARY OF THE INVENTION

It is therefore an object of this invention to provide a method for determining the skew of an image at high speed, without impairing the accuracy of the detection of the skew, such as in an image filing system in which a large amount of documents are to be inputted.

Another object of the invention is to provide a method for determining and correcting the skew of an image at high speed, without impairing the accuracy of detecting the skew, such as in an image filing system in which a large amount of documents are to be inputted.

Still another object of the invention is to provide an image data processing system, or an image filing system, adapting the foregoing method for detecting and correcting the skew of an image.

According to a first aspect of the invention, there is provided a method for determining the amount of an skew of image by repeating a predetermined process which obtains information dependent on the angle of the skew of image, for every small angle started from a reference direction with respect to image data, the method comprising the steps of: dividing the range of angle for the predetermined process into a plurality of stages; performing the predetermined process in sequence started from a narrow range of angle; and omitting the predetermined process for a range of angle wider than the narrower range of angle when the angle of skew is detected in the narrower range.

According to a second aspect of the invention, there is provided a method for determining the amount of an skew of image by integrating the document image or a characteristic amount of the image documents in a plurality of directions and by discriminating the direction in which the value of integration is the extreme value, the method comprising the steps of: executing the integrating and the discriminating firstly for a narrow range of angle including a reference direction; and further executing the integrating and the discriminating for a range of angle wider than the narrow range of angle, when the extreme value is not obtained for the narrow range of angle.

In these methods, it is preferable to exclude substantially all of the narrow range of angle from the wide range of angle.

The narrow range of angle may have, for example, a lower limit between $-2$ and $-1$ degrees and an upper limit between $+1$ and $+2$ degrees, with the reference direction being zero degrees.

According to a third aspect of the invention, there is provided a method for correcting skew of a document image by detecting the angle of the skew of image by integrating the document image or a characteristic amount of the image document in a plurality of directions and by discriminating the direction in which the value of integration is the extreme value, the method comprising the steps of: performing the integrating and the discriminating firstly for the narrow range of angle including a reference direction; performing the integrating and the discriminating, when the angle of skew of image is not obtained for the narrow range of angle, for a range of angle wider than the narrow range of the angle; correcting the skew of image by the angle of skew when the angle of skew is obtained; and omitting the correcting of the skew of image when the angle of skew is not obtained.

In this skew correcting method, it is preferable that the correcting is omitted when the angle of skew of image is within a predetermined range of angle, e.g., about ±1.0 degrees with respect to the reference direction.

According to a fourth aspect of the invention, there is provided an image data processing system using image data which is read by an image reader, comprising: an image data storage means for storing the image data; first skew angle evaluating means for detecting, within a first range of angles, the skew of image represented by the image data; second skew angle evaluating means for detecting, within a second range of angles, wider than the first range of angles, the angle of skew represented by the image data; and correcting means for processing the image data so as to correct the skew of the image based on the angle of skew detected by the first or second skew angle evaluating means.

This image data processing system may further include angle setting means for the user to set the narrow range of angle and/or the wide range of angle.

According to a fifth aspect of the invention, there is provided an image filing system having an image reader with an automatic paper feeding device, comprising: an image data storage means for storing image data which is read by the image reader; skew angle evaluating means for detecting the angle of an skew of image represented by the image data, stepwise for a narrow range of angle including a peak of distribution of skew of a paper sheet fed by the automatic paper feeding device and then for a range of angle wider than the narrow range of angle; correcting means for processing the image data so as to correct the skew of the image based on the angle of skew detected by the skew angle evaluating means; displaying means for displaying the image data; and printing means for printing the image data.

Figure 2:
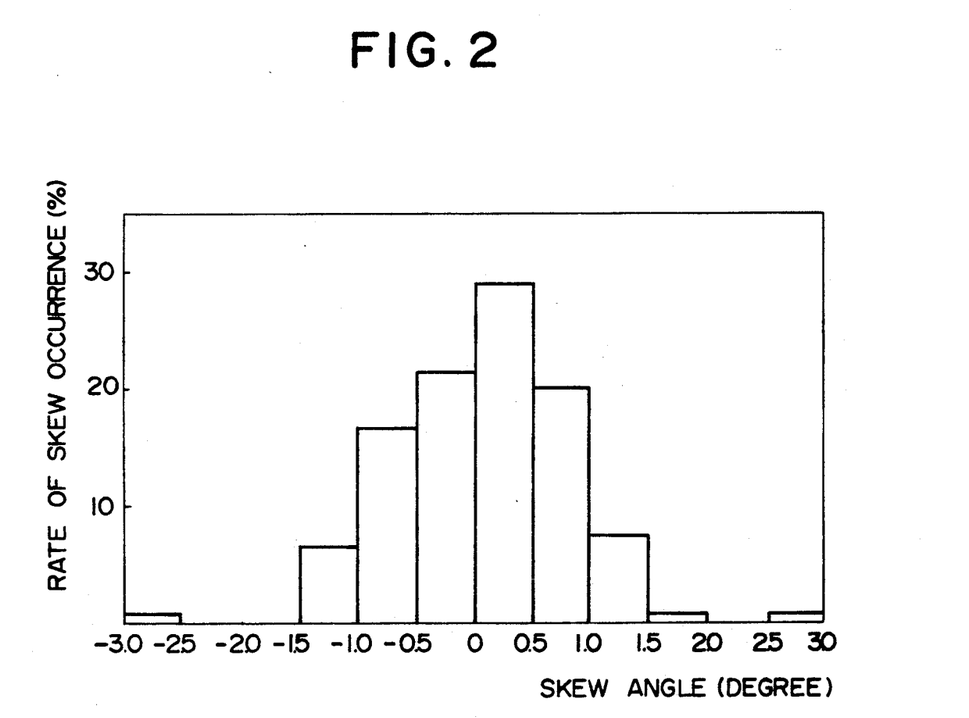
FIG. 2 is a graph showing distribution of occurrence of skew angles when a document is inputted.

In this invention, the characteristic of image data in a practical image filing is utilized. Specifically, in order to provide a high-speed system for detecting the angle of skew, the statistical characteristic of the rate of occurrence of skews is utilized. An example of distribution of skew occurrences will now be described with reference to FIG. 2. FIG. 2 shows a distribution of skew occurrences when a document was inputted to a scanner by using an automatic paper feeding device. This example shows the result of a test conducted on 300 paper sheets of A4 size in a particular scanner. As is apparent from FIG. 2, the actual skew angles are scattered over a wide range, but the majority are distributed within a narrow region near the zero degree, direction namely, more than 3 $\sigma$ falls within a range of ±1.5 degrees. Therefore, the rate of processing image data can be increased sharply by first searching only the central portion of the distribution and, further, only searching the remaining portion if no skew is found in the central portion.

Further, in increasing the rate of processing image data to regulate the skew, the sensing characteristic of a human being is utilized. In other words, it has been a common knowledge that a skew of a very small angle cannot been sensed by a human being. In addition, most of the skews occurring are of very small angles. Therefore, the rate of processing image data can be increased more sharply by effecting rotation of the image to correct the skew with respect to skews exceeding a particular small range that cannot be sensed by a human being, while disregarding corrective active with respect to skews within the particular small range.

Specifically, the image inputting unit performs two kinds of processes, i.e., measuring and correcting the angle of skew relating to the inputted image.

Figure 3A:
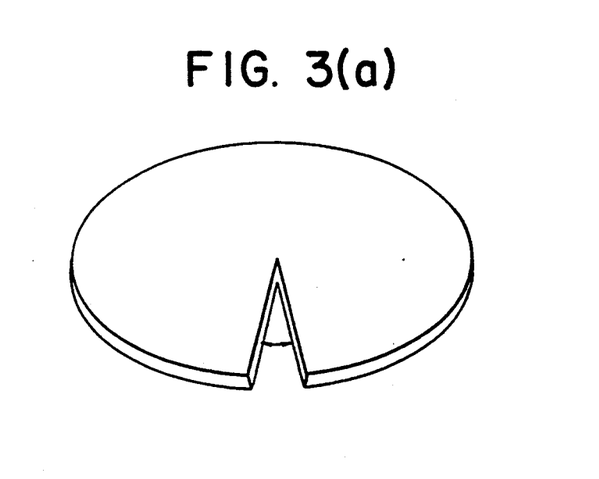
FIGS. 3(a) and 3(b) are diagrams showing a stepwise angle measurement in FIG. 1.
Figure 3B:
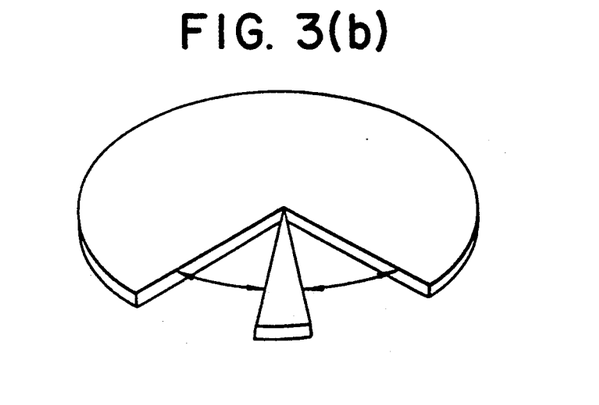

This measuring process is performed in two stages as shown in FIG. 3. FIG. 3($a$) shows a range of angles of skew to be detected at the first stage, in which a cutout portion, of a disk, indicated by a double-head arrow is searched for an angle corresponding to that of the skew. FIG. 3($b$) shows a range of angles of skew to be detected at the second stage, in which two cutout portions, of a disk, indicated by two double-head arrows are searched.

At the first stage, the angle of skew is searched in a narrow range within which skew distribution of an inputted image is concentrated. If the angle of skew is determined at the first stage, the measuring process terminates and then a process of correcting the image starts.

At the second stage, the angle of skew is searched in a relatively wide range over which skew distribution of an inputted image can exist, but excluding the central portion in which the angle of skew has already been searched. At this stage, considering that the angle of skew exists at the border of the two ranges, the two ranges may be preset so that they will slightly overlap each other at their borders.

With this two-stage arrangement, it is possible to greatly improve the processing rate sharply, compared to the conventional system in which searching is performed over all the ranges uniformly. For example, assuming that the range to be measured at the first stage of the process is ±1.5 degrees and that the range to be measured at the second stage is ±10 degrees, the processing rate can actually be improved by sixty times.

Here in this description, although the measuring technique is not specifically discussed, the Hough translation method, the peripheral projection method or any other method may be used with the same result. Further, the number of stages in the measuring process is not limited to two and may be three or more.

Then, correcting is performed by two kinds of processes depending on the angle to be corrected. Specifically, the correcting process is not performed for the very small range of angles that cannot be sensed by a human being, but is performed for a range of angles larger than the very small range of angles.

With the foregoing arrangement, it is possible to improve the processing rate, compared to that of the conventional system in which the skew of image is corrected uniformly through all the ranges. Assuming that the range in which a skew cannot be sensed is estimated to be within ±0.5 degree range or ±1.0 degree range, the processing rate can actually be improved by twofold or fivefold, respectively.

Here in this description, although the correcting technique is not specifically discussed, any suitable method may be adopted with the same result.

Accordingly, with this invention, partly because a skew of an inputted image is obtained in a stepwise operation, and partly because unnecessary rotation is eliminated, it is possible to provide a method for detecting and correcting the skew of an image with a drastically improved processing rate, compared to the conventional system.

For this invention to be effective, it is necessary that the skews of an image should be distributed within a particular range. In that sense, this invention is suitable for processing an image read with a scanner having an automatic paper feeding device. However, even when a paper sheet is to be fed manually, the angle of skew is detected and corrected at a high rate as a paper sheet is located within the above-mentioned wider range of angles, thus requiring no exact positioning of the paper sheet.

The above and other advantages, features and additional objects of this invention will be manifest to those skilled in the art upon making reference to the following detailed description and the accompanying drawings in which several preferred embodiments incorporating the principles of this invention are shown by way of illustrative example.

DETAILED DESCRIPTION

Embodiments of this invention will now be described with reference to the accompanying drawings.

Figure 7:
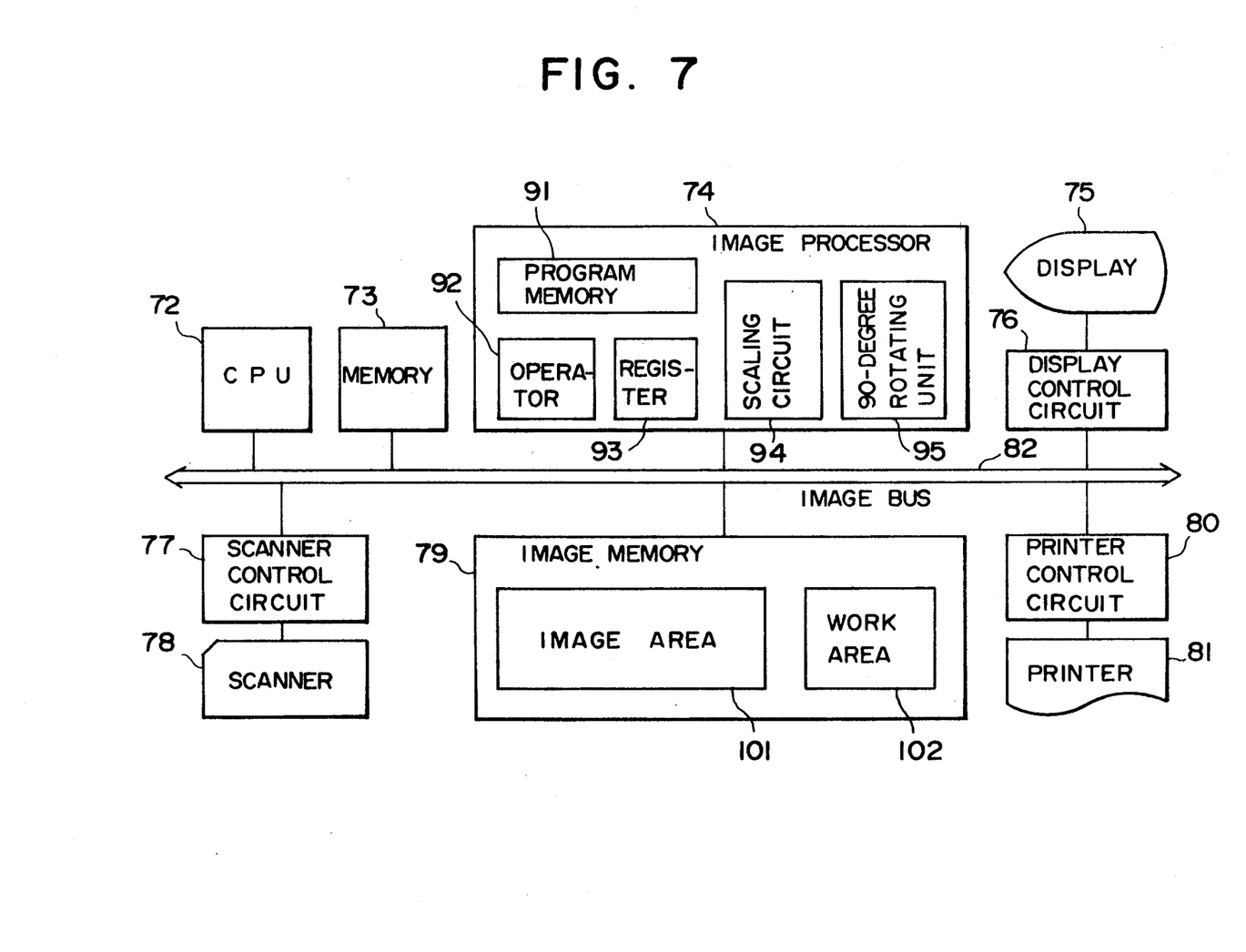
FIG. 7 is a block diagram showing an image filing system to which the invention is adopted.

FIG. 7 shows the hardware of an electronic filing system as an image filing system embodying this invention.

The electronic filing system comprises a scanner 78 and a scanner control circuit 77 for optically reading an inputted document and translating the document into image data as electrical signals, an image memory 79 for storing the image data, an image processor 74 for performing various kinds of processes for the image data stored in the image memory 79, a display 75 and a display control circuit 76 for displaying the image, a printer 81 and a printer control circuit 80 for printing the image, a central processing unit (CPU) 72 for controlling the entire system, and a memory 73 utilized by the CPU 72. These components are mutually interconnected by an image bus 82.

The image memory 79 is divided into an image area 101 for storing image data, and a work area 102 for working use. The image processor 74 comprises a program memory 91 in which microprograms for various processes are stored, a register 93 for performing various processes, an operating unit 92, a scaling circuit 94, and a 90-degree rotating circuit 65. The image processor 74 performs detecting and correcting the angle of an skew of image, as described below.

Figure 6:
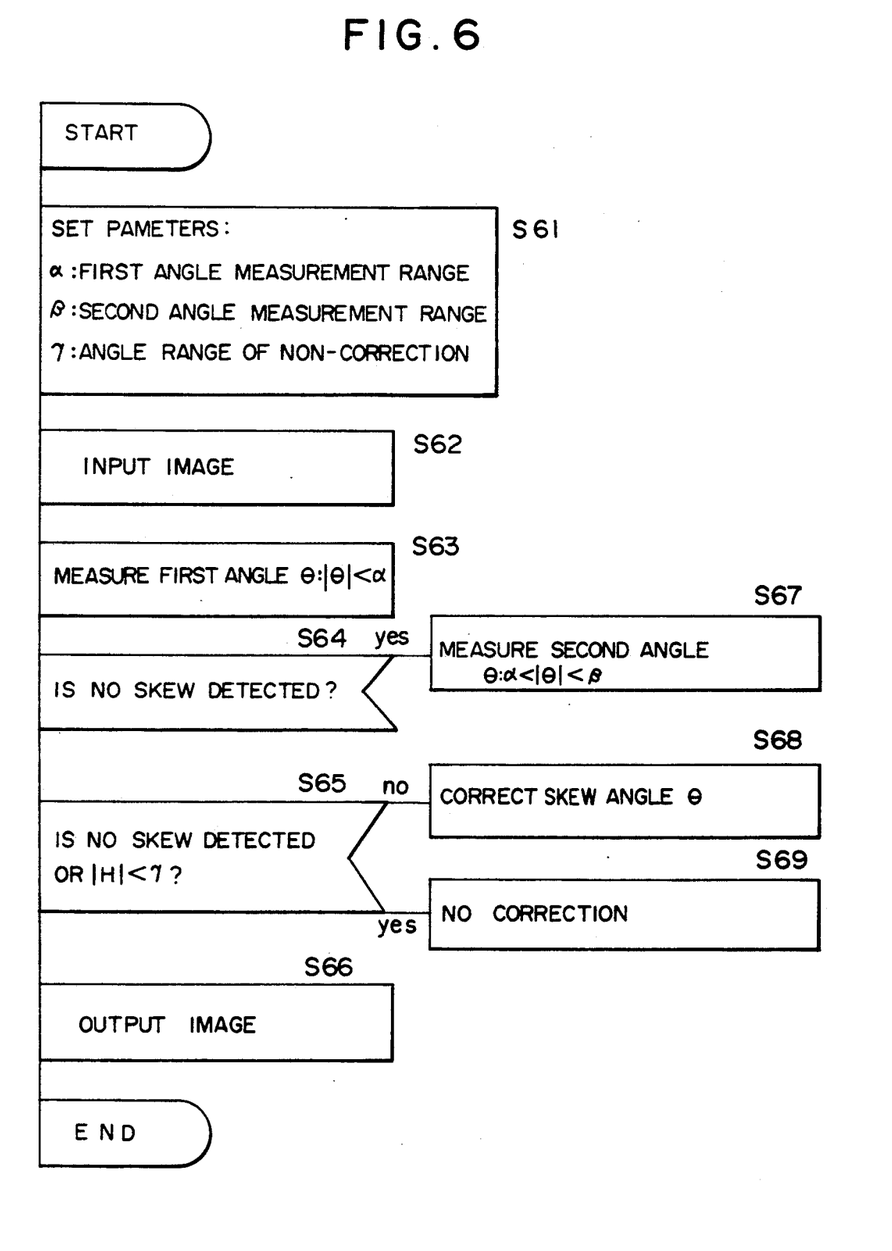
FIG. 6 is a flow diagram showing detecting and correcting of the skew of an image.

FIG. 6 is a flow diagram (Problem Analysis Diagram, hereinafter called PAD) showing one example of a method for detecting and correcting skew of image according to this invention.

For detecting and correcting skew of image, firstly predetermined parameters are set (S61). In this example, the parameters included are a first range $\alpha$ of angles to be measured, a second range $\beta$ of angles to be measured, and a range $\gamma$ of angles to be not corrected. If any of these parameters should be a fixed value, this setting is unnecessary for the parameter.

Then, an image is inputted (S62). In this embodiment, this image inputting is performed by scanning a document image by a scanner equipped with an automatic paper feeding device. Alternatively, the image inputting may be performed by reading image data stored in an external storage or by receiving image data via a facsimile. Subsequently, an angle measurement within the first angle range $\alpha$ is performed (S63). If the angle of skew is detected (S64 yes), a discrimination is made (S67), for the second angle range $\beta$ (excluding the range $\alpha$), as to whether or not the angle of skew is detected. If the angle of skew was detected in the process S63, this process S67 is not performed. If the angle of skew was detected (S65 no) in the process S63 or S67, a rotation is given (S68) to image data only by the angle of skew $\theta$. If the angle of skew could not be detected in either angle range, or if the detected angle of skew $\theta$ was smaller than $\gamma$ (S65 yes), correcting should not be performed (S69). Finally, the image which is corrected or one without correction is outputted (S66) to complete all the processes.

Figure 1:
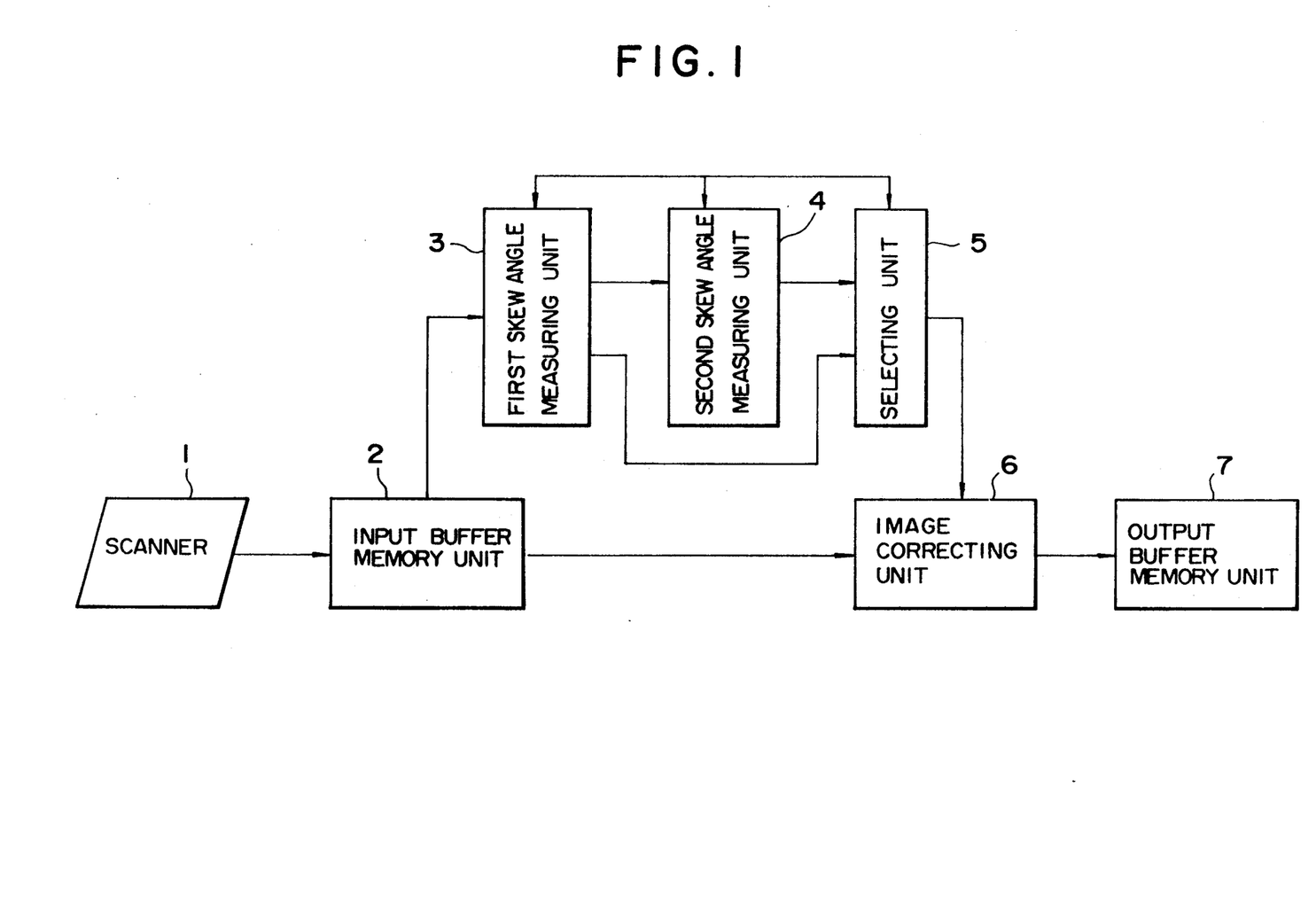
FIG. 1 is a block diagram showing an image data processing system embodying this invention.

FIG. 1 shows a block diagram showing the function of an image data processing system for detecting and correcting the skew of an image.

In FIG. 1, reference numeral 1 designates a scanner for obtaining a digital image in binary form from an optical image of an inputted document; 2, an input buffer memory unit for temporarily storing the digital image; 3, a first skew angle measuring unit for searching over only the central portion of distribution of skew; 4, a second skew angle measuring unit for searching over the maximal range in which distribution of skew exists; 5, a selecting unit for receiving a detection signal from the first skew angle measuring unit 3 or second skew angle measuring unit 4; 6, an image correcting unit for correcting the skew of digital image when an angle value is larger than a set value; and 7, an output buffer memory unit for temporarily storing the result of image correction.

The operation of each of elements in FIG. 1 will now be described.

After having been optically scanned, a document inputted to the scanner 1 is translated into a binary digital image and is then inputted into the input buffer memory unit 2.

The digital image inputted to the input buffer memory unit 2 is stored therein temporarily and is then outputted to the first skew angle measuring unit 3 and the image correcting unit 6 in a timed relation.

Subsequently, the skew of the digital image is measured by a succession of processes of from the first skew angle measuring unit 3 to the selecting unit 5, and the result of measurement is posted to the image correcting unit 6. In the first skew angle measuring unit 3, measurement is performed within the narrow range of angles upon which the distribution of skew of inputted images are concentrated. Contour extraction and calculating of circumscribed bottom coordinate are performed on the inputted digital image. Integrating is then performed on the calculated bottom coordinate for every unit angle within the narrow range. In this embodiment, the narrow range was between −1.5 degrees and +1.5 degrees for every 0.2 degrees. Then, the peak of the calculated integration value is obtained. If there exists a peak value, a skew angle detection signal is transmitted to the second skew angle measuring unit 4 and the selecting unit 5, while an angle value equivalent to the peak is outputted to the selecting unit 5.

In the second skew angle measuring unit 4, measurement is performed over the wide range of angle in which distribution of skew of the inputted image can exist, according to the absence of the skew angle detection signal in the first measurement. Specifically, if the skew angle detection signal is inputted, the angle of skew is already determined, and therefore the second measurement is not made. Reversely, if the skew angle detection signal is not present, searching is performed over the wide range of angle. The digital image is inputted from the first skew angle measuring unit 3, and contour extraction and calculating the circumscribed bottom coordinate are performed. Then, integrating is performed for every unit angle within the range to be measured is performed with respect to the calculated bottom coordinate. In this embodiment, this measurement range was set between −10 degrees and +10 degrees excluding the range between −1.5 degrees and +1.5 degrees for every 0.2 degrees. Then, a peak of the calculated integration value is obtained, and an angle value equivalent to the peak is outputted to the selecting unit 5.

In this embodiment, the second angle measurement range completely excludes the first angle measurement range. Alternatively, considering that the angle of skew exists at the borders of the two ranges, the excluding portion of the first angle measurement range may be set such that the two ranges slightly overlap each other at the borders. In this case, during the second angle measurement, it is unnecessary to perform integrating again for the portion where the two ranges overlap each other since the data calculated for the first angle measurement range can be utilized.

The selecting unit 5 selects angle values of the two measuring units 3, 4 according to the skew angle detecting signal applied from the first skew angle measuring unit 3. If a skew angle detection signal is applied, the selecting unit 5 selects a value of the first skew angle measuring unit 3. Reversely, if a skew angle detection signal is not applied, it selects a value of the second skew angle measuring unit 4. Finally, the selected angle value is outputted to the image correcting unit 6.

The image correcting unit 6 corrects, based on the applied angle value, the skew of digital image applied from the input buffer memory unit 2. To avoid unnecessary correction of a skew that cannot be sensed by a human being, an angle value is compared with the preset value, and values below the preset value are rounded down to zero.

The digital image is rotated for a desired angle according to the following definition. Assuming that a pixel coordinate of an original image is (x, y), a pixel coordinate of an image rotated is (X, Y), and the angle of rotation is $\theta$, $$\begin{bmatrix} X \\ Y \end{bmatrix} = T3 \cdot T2 \cdot T1 \begin{bmatrix} x \\ y \end{bmatrix} \quad (1)$$

$$T1 = \begin{bmatrix} \cos\theta & 0 \\ 0 & \sec\theta \end{bmatrix} \quad (2)$$

$$T2 = \begin{bmatrix} 1 & -\sin\theta\cos\theta \\ 0 & 1 \end{bmatrix} \quad (3)$$

$$T3 = \begin{bmatrix} 1 & 0 \\ \tan\theta & 1 \end{bmatrix} \quad (4)$$

In the above equations T1 represents a factor of scaling (expand/reduce), and T2 and T3 represent transformation matrixes with respect to respective oblique axes.

The transformation of the equation (1) is similar to an affine transformation defined by the following equation:

$$\begin{bmatrix} X \\ Y \end{bmatrix} = \begin{bmatrix} \cos\theta & -\sin\theta \\ \sin\theta & \cos\theta \end{bmatrix} \begin{bmatrix} x \\ y \end{bmatrix} \quad (5)$$

The transformation matrixes T1, T2. and T3 are not limited to the respective equation (2), (3) and (4).

The digital image is scaled (expanded/reduced) and is transformed with respect to the respective oblique axes, thus obtaining a digital image with a normalized skew. Finally, the digital image is outputted to the output buffer memory unit 7. The digital image inputted from the output buffer memory unit 7 is supplied, as image data, to an image filing system or a workstation.

The construction and operation of each of the first and second skew angle measuring units 3, 4 will now be described.

Figure 4:
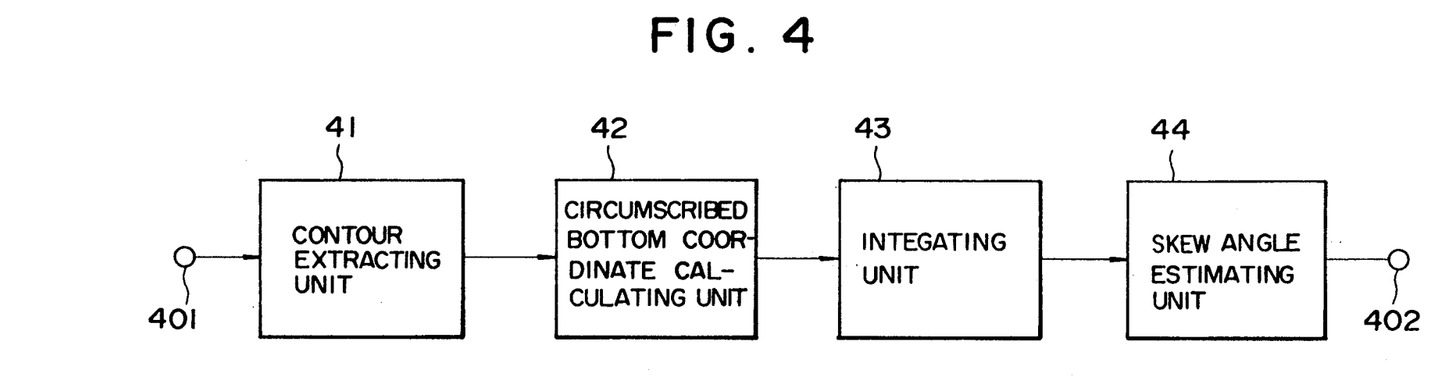
FIG. 4 is a block diagram showing a skew angle measuring unit in FIG. 1.

FIG. 4 is a block diagram showing the detailed construction of the first or second skew angle measuring unit 3, 4. The construction of the skew angle measuring unit is known in the art and represents one example of a skew angle measuring means. In FIG. 4, reference numeral 41 designates a contour extracting unit for scanning a digital image and for extracting the contour of each character or the like; 42, a circumscribed bottom coordinate calculating unit for obtaining a bottom coordinate value from a rectangle circumscribing the contour; 43, an angle integrating unit for integrating the bottom coordinate value in each direction; 44, a skew angle estimating unit for obtaining a peak of the integrated values; and 401, 402, an input terminal and an output terminal, respectively.

In operation, in FIG. 4, a digital image is inputted to the contour extracting unit 41 via the input terminal 401.

The contour extracting unit 41 sequentially traces the contour over a graphic form such as a character and creates a table from the coordinates at every contour point. The created table is outputted to the circumscribed bottom coordinate calculating unit 42.

The circumscribed bottom coordinate calculating unit 42 extracts a set of coordinate values for each of the graphics. In this embodiment, perceiving that the bottom of a character extends in a straight line, the circumscribed bottom coordinate calculating unit 42 uses the coordinate value of the bottom right of a character. Specifically, the calculating unit 42 searches a contour table of each of the graphics and selects a maximal value on each axis as a characteristic. Finally, the calculating unit 42 outputs the selected circumscribed bottom coordinate values to the angle integrating unit 43.

The angle integrating unit 43 integrates the circumscribed bottom coordinate values for each angle within the searched range. Specifically, the angle integrating unit 43 projects each circumscribed bottom coordinate in the direction of angle and takes the inputted distribution of skew occurrences. Finally the angle integrating unit 43 outputs the distribution of skew occurrences for each angle to a skew angle estimating unit 44.

The skew angle estimating unit 44 estimates an angle value from the applied distribution of skew occurrences. Specifically, the skew angle estimating unit 44 scans the created distribution of skew occurrences and selects an angle having a maximal peak value. The estimating unit 44 outputs the selected angle value, as an angle of skew of the inputted digital image, to the external via the output terminal 402.

Figure 5:
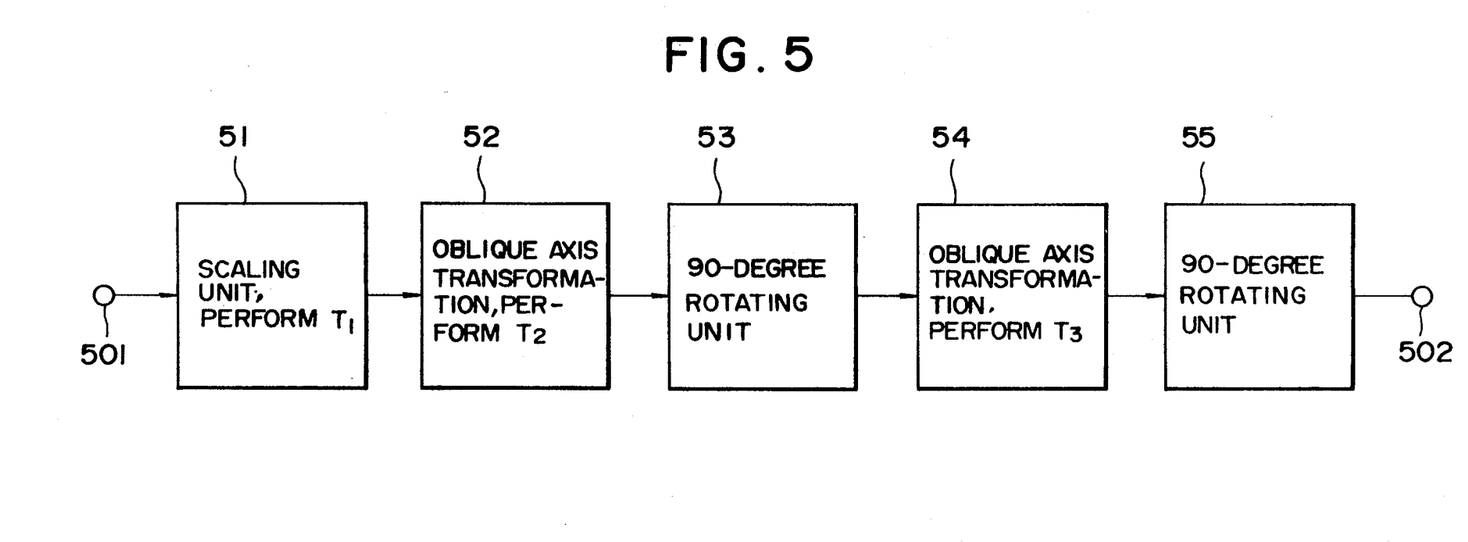
FIG. 5 is a block diagram showing an image correcting unit in FIG. 1.

The construction and operation of the image correcting unit 6 will now be described.

FIG. 5 is a block diagram showing one example of the image correcting unit 6. The construction of the image correcting unit 6 is known in the art as disclosed in, for example, Japanese Patent Laid-Open Publication (KOKAI) No. 97473/1985 and represents one example of image correcting means.

In FIG. 5, reference numeral 51 designates a scaling unit for performing transformation T1; 52, an oblique axis transforming unit for performing transformation T2; 53, a 90-degree rotating unit for realizing transformation T3 by shifting in the direction of X axis; 54, an oblique axis transforming unit for performing transformation T3; 55, a 90-degree rotating unit for restoring perpendicular transformation that was performed by the oblique axis transforming unit 54; 501, an input terminal through which an original image is inputted; and 502, an output terminal through which a corrected image is outputted.

In operation, a digital image is supplied to the scaling unit 51 via the input terminal 501.

The scaling unit 51 performs transformation T1 of the equation (2) over the inputted digital image. The transformation T1 reduces the image by $\cos \theta$ in the direction of x axis and expands the image by $\sec \theta$ in the direction of y axis. The scaling unit 51 outputs the scaled digital image to the oblique axis transforming unit 52.

The oblique axis transforming unit 52 performs transformation T2 of the equation (3) over the inputted digital image. The transformation T2 is realized by shifting the image by displacement of $-\sin \theta \cos \theta$ in the direction of x axis. The oblique axis transforming unit 52 outputs to the 90-degree rotating unit 53 the digital image to which oblique axis transformation was added.

The 90-degree rotating unit 53 rotates the inputted digital image by 90 degrees in the clockwise direction. With this 90-degree rotation, transformation T3 of the equation (4) that is difficult to access from the memory is transformed into shift processing in the direction of raster, which is easy to memory access. The 90-degree rotating unit outputs to the oblique transforming unit 54 the digital image rotated by 90 degrees.

The oblique axis transforming unit 54 performs transformation T3 of the equation (4) over the inputted digital image. In general, transformation T3 can be realized by shifting the image by displacement of $\tan \theta$ in the direction of y axis. However, since the inputted image is already rotated by 90 degrees, transformation T3 can be realized by shifting by displacement of $\tan \theta$ in the direction of x axis. The oblique axis transforming unit 54 outputs to the 90-degree turning unit 55 the digital image to which oblique axis transformation in the direction of y axis of the original image was added.

The 90-degree turning unit 55 turns the inputted digital image by 90 degrees in the counterclockwise direction. By this 90-degree turning, the 90-degree turning unit 55 performs transformation in such a direction as to cancel the process that was added by the 90-degree turning unit 53. The digital image corrected according to this procedure is outputted to the external via the output terminal 502.

As is apparent from the foregoing description, according to this embodiment, partly since a skew angle of an inputted image is obtained by a stepwise operation, and partly since any unnecessary turning process is eliminated, it is possible to sharply reduce the processing time required for correcting the skew of an inputted image.

In this embodiment, the range over which the first skew angle measuring unit performs searching is limited. Alternatively, if distribution of skews varies depending on the property (thickness, quality, etc.) of paper of an inputted document, such range may be varied automatically or manually. The automatic varying may be accomplished by recognizing the property of paper sheets automatically or from the associated cassette of the paper sheets.

Further, in this embodiment, the automatic image correcting means is mounted in the image input unit. Alternatively, it may be mounted in the image display unit or may be located between the input unit and the display unit.

In addition, in the illustrated embodiment, this invention is incorporated in an electronic filing system equipped with an image reader. However, this invention may be applied in detecting and correcting skew of image in data processing system, with no image reader, such as a machine which receives image data from a communication line like facsimile, or a workstation; word processor and the like which receive image data from the machine. This invention may be also applied to OCR (Optical Card Reader).

According to this invention, since the angle of skew of an image is determine by a stepwise operation, perceiving the manner of the distribution of occurrences of skew angles, it is possible to improve the measuring rate sharply, compared to the conventional system in which searching is performed uniformly over all of the ranges.

Further, since correction is not added to skews of a very small angle that cannot be recognized by eye, it is possible to improve the rate of correcting process, compared to the conventional system in which correcting is performed uniformly over all the ranges.

Still further, it is possible to realize automatic image inputting at high rate, which has been a significant problem with an image filing system. Particularly when this invention is used in departments where a huge amount of image data is inputted, the resulting advantages of this invention would be unexpectedly great from a practical view point.

What is claimed is:

1. A method for correcting the skew of a document image with respect to a reference angle by detecting the angle of skew of an image by integrating the document image or a characteristic amount of the document image in a plurality of radial directions and by discriminating as to the direction in which the resultant value of integration thereof is peak, the method comprising the steps of:
   (a) performing first an integrating and discriminating operations for a narrow range of angles including the reference angle;
   (b) performing next the integrating and discriminating operations for a range of angles wider than that of said narrow range only when no angle of skew of the document is obtained by the integrating and discriminating operations for the narrow range;
   (c) performing correction of the skew of the image in accordance with the angle of skew obtained in either step (a) or step (b); and
   (d) omitting correction of the skew of the image when the angle of skew is not obtained with respect to the integrating and discriminating operations in steps (a) or (b).

2. The method according to claim 1, wherein the step of correction of the skew is omitted when the angle of skew of the image obtained is within a predetermined small range.

3. The method according to claim 2, wherein said predetermined range of angles is a range between about ±1.0° with respect to the reference angle.

4. The method according to claim 1, wherein said predetermined range of angles is a range between about ±1.0° with respect to the reference angle.

5. An image data processing system using image data which is read by an image reader, comprising:
   (a) an image data storage means for storing the image data read by said image reader;
   (b) a first skew angle evaluating means for detecting, within a first range of angles, the angle of skew of the image represented by the image data with respect to a reference angle;
   (c) a second skew angle evaluating means for detecting, within a second range of angles wider than the first range of angles, the angle of skew of the image in the case in which no skew angle of the image is detected by the first skew angle evaluating means; and
   (d) correcting means for processing the image data so as to correct the skew of the image based on the angle of skew detected by the first or second skew angle evaluating means.

6. The image data processing system according to claim 5, further comprising an angle setting means for a user to set the first range of angles and/or the second range of angles.

7. The image data processing system according to claim 6, wherein said first range of angles has a lower limit angle between $-2°$ and $-1°$ and an upper limit angle between $+1°$ and $+2°$, with the reference angle being $0°$.

8. The image data processing system according to claim 7, wherein the upper and lower limits of the first range of angles are overlapped by the lower and upper limits of angles of the second range of angles, respectively.

9. The image data processing system according to claim 6, wherein the upper and lower limits of the first range of angles are overlapped by the lower and upper limits of angles of the second range of angles, respectively.

10. An image filing system having an image reader with an automatic paper feeding device, the system comprising:
    (a) an image data storage means for storing image data which is read by the image reader;
    (b) a skew angle evaluating means for detecting the angle of skew of the image represented by the image data, first for a narrow range of angles including an angle with a peak of distribution of skew of a paper sheet fed by the automatic paper feeding device and then for a wider range of angles, if no angle of skew is detected for the narrow range, said wider range of angles excluding a range substantially equal to the narrow range;
    (c) correcting means for processing the image data so as to correct the skew of the image based on the angle of skew detected by the skew angle evaluating means;
    (d) displaying means for displaying the image data; and
    (e) printing means for printing the image data.

11. The image data processing system according to claim 10, wherein the upper and lower limits of the narrow range of angles are overlapped by the lower and upper limits of angles of the wider range of angles, respectively.

* * * * *